United States Patent [19]

Auer et al.

[11] Patent Number: 4,593,990
[45] Date of Patent: Jun. 10, 1986

[54] CONTROL DEVICE FOR CONTROLLING A DIAPHRAGM SLOT IN A MICROFILM-READING AND ENLARGING APPARATUS

[75] Inventors: Josef Auer, Achstetten; Hubert Hackenberg, Holzkirchen, both of Fed. Rep. of Germany

[73] Assignee: Agfa-Gevaert AG, Leverkusen, Fed. Rep. of Germany

[21] Appl. No.: 718,424

[22] Filed: Apr. 1, 1985

[30] Foreign Application Priority Data

Apr. 14, 1984 [DE] Fed. Rep. of Germany ....... 3414278

[51] Int. Cl.⁴ ............................................. G03B 13/28
[52] U.S. Cl. ...................................... 355/45; 355/66
[58] Field of Search ................. 355/45, 47, 48, 49, 355/50, 51, 66

[56]  References Cited

U.S. PATENT DOCUMENTS

| 3,609,037 | 9/1971 | Suzuki | 355/66 |
| 3,917,393 | 11/1975 | Nier | 355/49 |
| 4,232,960 | 11/1980 | Glab | 355/66 |
| 4,299,480 | 11/1981 | Gilkeson | 355/45 |

Primary Examiner—Monroe H. Hayes
Attorney, Agent, or Firm—Michael J. Striker

[57] ABSTRACT

A device for controlling the width of a slot of a diaphragm of a microfilm-reading-and-copying apparatus in which an enlarged microimage is projected by two inclined mirrors mounted on a movable carriage and via the slot of the diaphragm on a copying cylinder. The diaphragm is formed by two flaps of which one is stationary and another one is movable between a closed position to close the slot and a plurality of open positions to adjust the width of the slot. The drive of the movable flap is provided with a rotatable cam which is coupled to the movable carriage.

16 Claims, 6 Drawing Figures

CONTROL DEVICE FOR CONTROLLING A DIAPHRAGM SLOT IN A MICROFILM-READING AND ENLARGING APPARATUS

BACKGROUND OF THE INVENTION

The present invention relates to microfilm-reading and enlarging apparatus in general, and more specifically to a control device for adjusting the width of a diaphragm slot in the diaphragm of the microfilm-reading-and-enlarging apparatus.

In the microfilm-reading-and-copying apparatus of the foregoing type an enlarged microimage is projected in image columns by means of two mirrors, inclined at 45° to the optical axis of the projection lens, and the diaphragm having a slot onto a copying drum or cylinder. The two mirrors are positioned on a movable carriage which is moved synchronously with the copying drum.

In such known apparatus the decrease in light intensity or luminosity of the image being copied in the regions of its edges in the direction of transportation of the scanning device or the copying drum or the copy paper is compensated for by an electronic adjustment of the light intensity of the illumination system in dependence on the position of the carriage on which the above mentioned mirrors are disposed.

SUMMARY OF THE INVENTION

It is an object of the present invention to provide an improved control device for controlling a diaphragm slot in a microfilm-copying-and-enlarging apparatus.

It is another object of the present invention to provide a control device which is easy to operate and inexpensive to manufacture.

The present invention offers a simple and inexpensive solution for taking into consideration a decrease in clearness of the projected image.

These and other objects of the present invention are attained by a control device for controlling a slot in a diaphragm of a microfilm-reading-and-enlarging apparatus of the type including an illumination system, a projection lens having an optical axis, a movable carriage carrying thereon two mirrors facing each other and inclined at 45° relative to said optical axis, a diaphragm having a slot, and a copying cylinder rotatable synchronously with the movement of said carriage and wherein an enlarged microimage is projected in columns by said mirrors and through said slot onto said copying cylinder, and wherein the control device comprises means for adjusting said slot, said diaphragm including two flaps having edges forming said slot, at least one of said flaps being movable from a position closing said slot to a plurality of various open positions in which various widths of said slot are obtained, said adjusting means being operative for moving one of said flaps to each position, said adjusting means being coupled with said carriage.

The device may further include drive means for reciprocally moving said carriage, said drive means including a crank drive and driven chain means connected to said drive, said chain means including a wheel, said adjusting means including a cam disc coupled with said wheel.

The adjusting means may further include at least one control arm coupled to said one flap and at least one cam element mounted to said cam disc for joint rotation, said control arm cooperating with said cam element.

The edge of the movable flap may extend parallel to an axis of said cylinder over a straight line while the edge of the stationary flap, forming said slot, may be curved.

The movable flap may be a plate having two ends, two said control arms may be connected to said ends.

The control arm may be pivotable about an axis and may include two levers angularly positioned relative to each other, one of said levers having a free end which lies on said cam element.

The control arm may include an adjusting bolt between said levers.

The adjusting means may further include a spring biasing said control arm against said cam element. Another of said two levers may rest on the adjusting bolt under the action of said spring in a force-locking fashion.

The cam element has a cam surface extending over 360° and which may have an angular cam portion corresponding to the movement of said carriage before and after a copying process, said angular cam portion being formed by a curvature having a smaller radius $R_3$, whereby when said free end of said control arm cooperates with said angular cam portion of said cam element said one movable flap overlaps another of said flaps to cause said closing position.

The cam surface of the cam element may include a further angular cam portion, whereby while said free end cooperates with said further angular portion the latter effects the movement of said movable flap to a plurality of open positions.

The further angular cam portion may have radii $R_1$ and $R_2$, wherein radius $R_1$ is the greatest radius on the cam element and effects the movement of said movable flap to its remotest open position from said another flap to provide the slot of the greatest width, wherein the further angular cam portion has radius $R_2$ in the middle thereof, and wherein $R_3<R_2<R_1$.

The device may further include an additional cam element coupled to said cam disc and vertically offset relative to said at least one cam element, said control arm being displaceably supported on said pivot axle and being selectively brought into engagement with said at least one cam element or said additional cam element.

The control device may further include switch means, said adjusting means further including a switch cam mounted to said cam disc for joint rotation and cooperating with said switch means for switching on and off said drive means and for switching over said illumination system.

The structural components which constitute the control device, can be manufactured without any troubles and be accommodated in the copying part of the microfilm-reading-and-enlarging apparatus, For example, the cam disc, as well as drive wheels, can be produced from plastics by injection molding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing. BRIEF DESCRIPTION OF THE DRAWINGS FIG. 1 is a schematic view of the micro-film-reading-and-enlarging apparatus of the invention, as viewed at a projection screen; FIG. 2 is a top plan view of the apparatus of FIG. 1; FIG. 3 is a side view of the apparatus of FIG. 1; FIG. 4 is the detail of the apparatus of FIG. 1, on the enlarged scale; FIG. 5 is the detail of the apparatus of another embodi-ment of the invention; and FIG. 6 is a top plan view of the detail shown in FIG. 5.

DETAILED DESCRIPTION OF THE PREFERRED EMBODIMENTS

Figure 1:
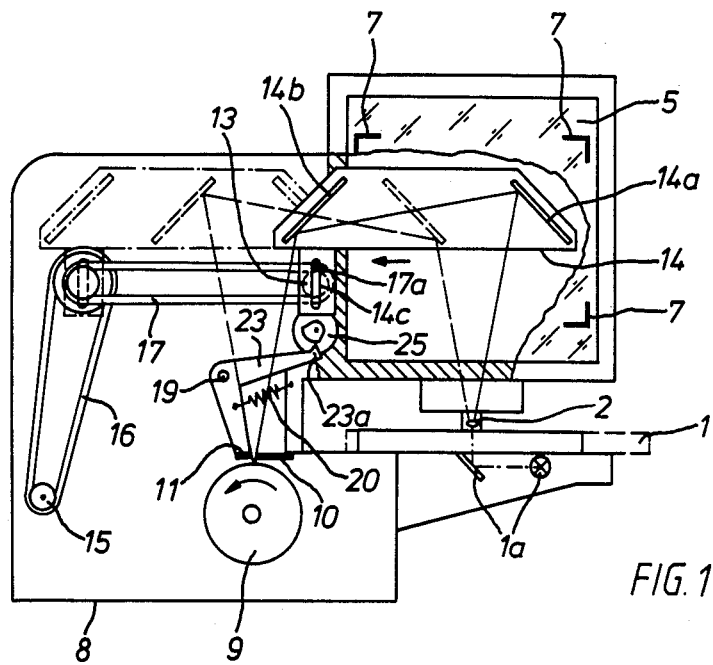
Figure 2:
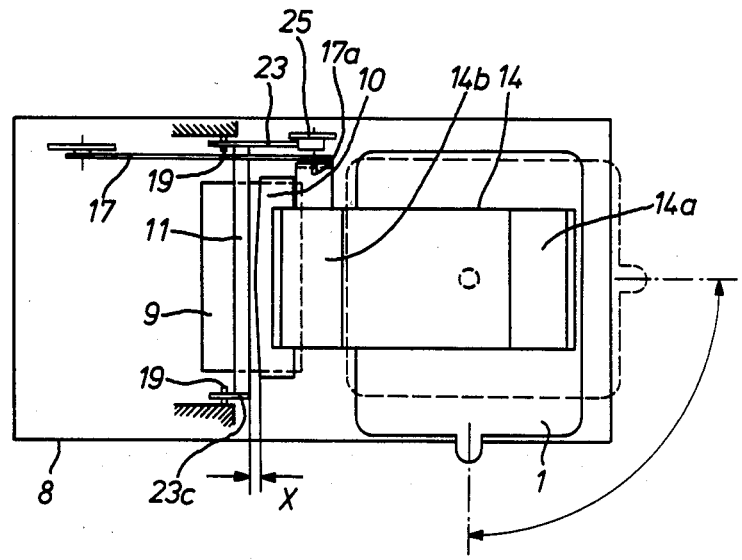
Figure 3:
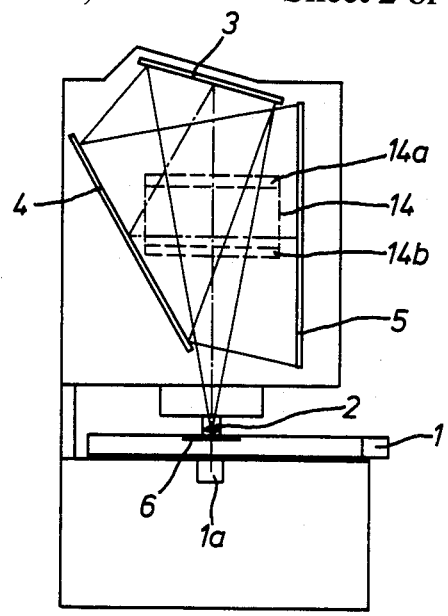

A microfilm-reading-and-enlarging apparatus according to the first embodiment of the invention is illustrated in FIGS. 1–4 and is basically comprised of a microfilm-reading part and a copying part. The microfilm-reading part is best illustrated on a side view in FIG. 3. A microfiche platform 1, which is displaceable in two coordinate directions and rotatable at least 90°, an illumination system 1a, positioned below the platform 1, a projection lens 2, deflection mirrors 3 and 4, and a projection screen 5 are located in the lower part of the microfilm-reading apparatus. The projection screen 5 has markings 7 which limit the area which is copied during the copying process and on which the image of a microfiche 6, lying on the microfiche platform 1, is adjusted before the copying process starts. Upon the rotation of platform 1 the image is observed in accordance with the height and width format and copied.

The copying part of the apparatus includes an electrophotographic copying device 8 which comprises a selenium cylinder or drum 9 and an illumination device. The illumination device projects the image columns of the total image on the selenium cylinder 9 and moves the columns of the microimage being copied and enlarged synchronously with the rotation of cylinder 9. The width of the projected image column simultaneously determines the time of illumination. This width is determined by the width of the slot of the diaphragm, which slot in the exemplified embodiment is defined between a stationary diaphragm strip-like flap 10 and a diaphragm flap 11 which is movable parallel to strip 10. In order to compensate for decrease in luminosity or clearness at the area of the rim of the image projected transversely of the direction of transportation of the cylinder 9 and the copy paper the stationary diaphragm flap 10 is curved so that the width of the diaphragm slot is the smallest in its center. However, the luminosity decrease in the rim area of the image, projected in the direction of the cylinder-and-paper movement should be compensated for by a different diaphragm slot width in dependence on, whether the upper edge or the lower edge or the middle of the image is projected through the diaphragm slot.

The column-like copying of the projected image is obtained by a mirror carriage 14, to which two mirrors 14a and 14b are secured, mirrors 14 and 14b facing toward each other and being both inclined at 45° relative to the course of rays of the objective. The movement of the carriage 14 with the speed, that is half of the speed of the copy paper, supported after its exposure on the selenium cylinder 9, is executed in the usual conventional fashion. The corresponding drive of the carriage 14 is provided by a drive pinion 15 rotated by any suitable conventional drive, chains 16 and 17 and a drive pin 17a connected to chain 17. Drive pin 17a is engaged in a slot of carriage 14, extended perpendicularly to the chain 17. The drive of carriage 14 also includes a crank guide. Chain 17 rotates a chain wheel 13, coaxially with which a tooth gear 24 is driven, which in turn drives a cam disc 25.

Figure 5:
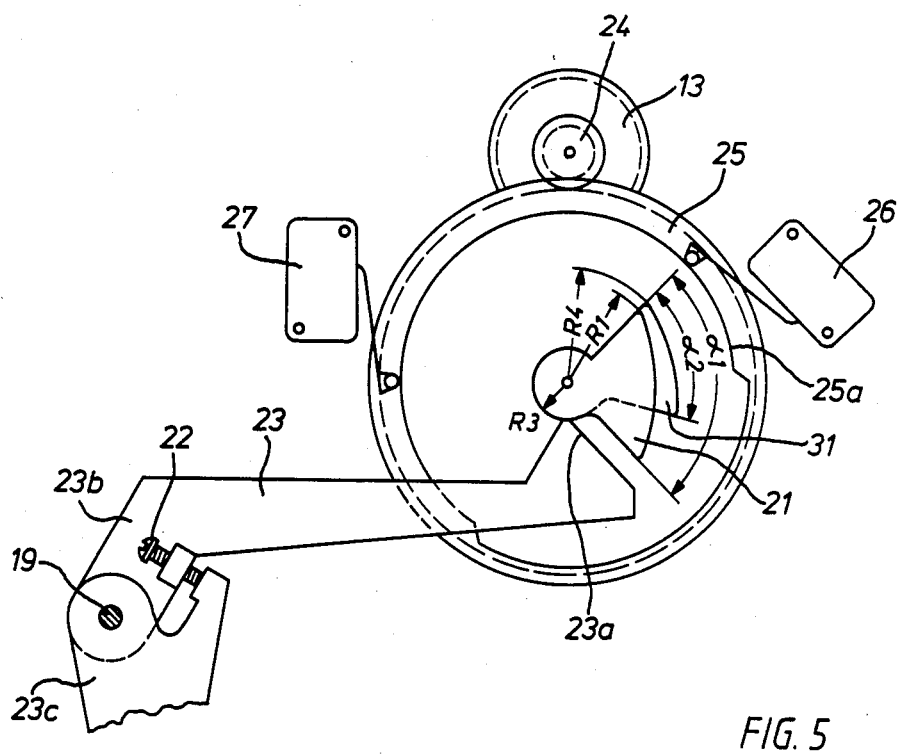
Figure 4:
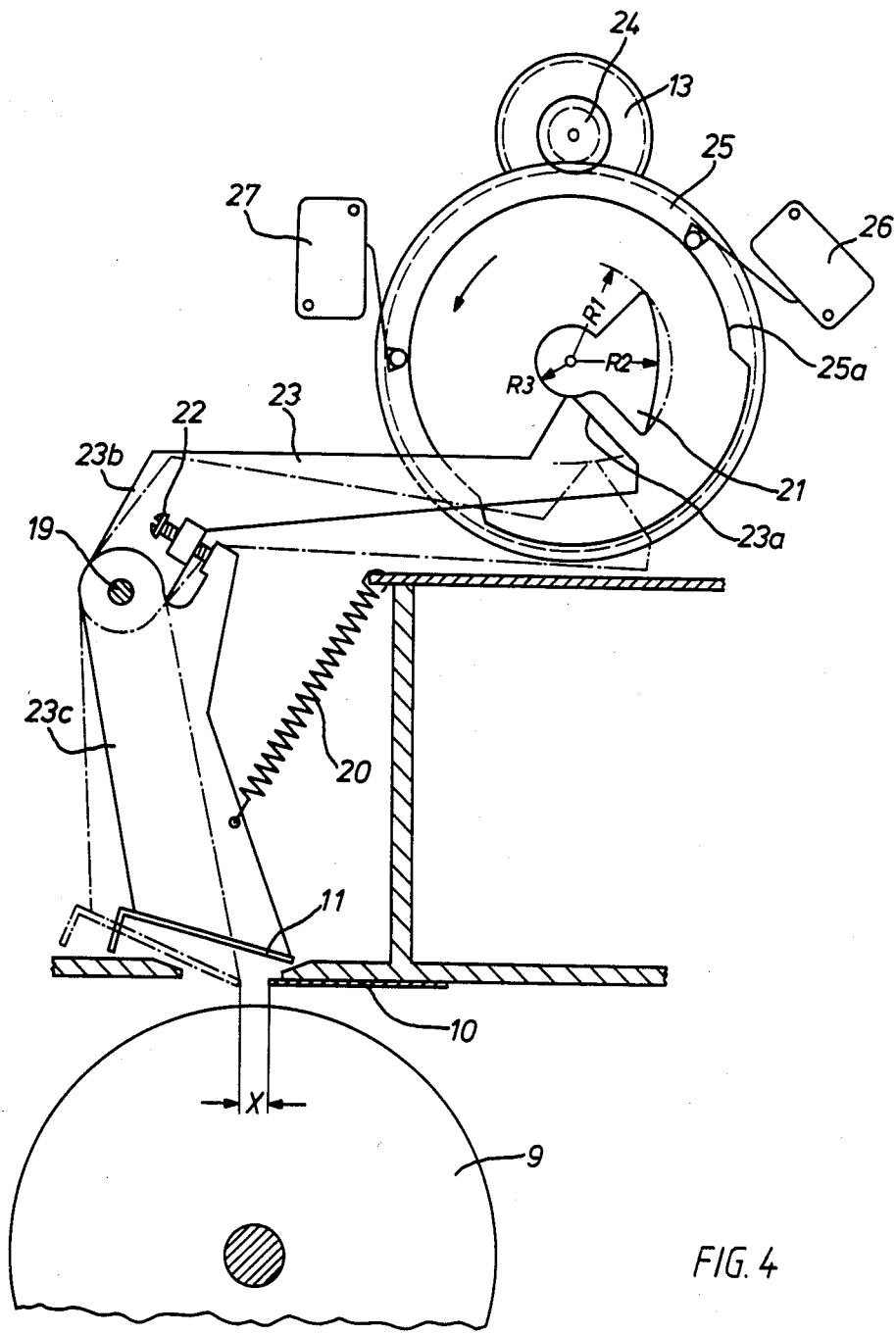

FIGS. 4 and 5 schematically illustrate two embodiments of the mechanisms for positioning the movable diaphragm flap 11 in various positions to adjust the diaphragm slot. FIG. 4 shows the flap 11 in its remotest or most open position in the dashdotted lines. With reference to FIG. 4 it will be seen that a cam element 21 is mounted coaxially with the cam disc 25. The periphery of the cam element 21 constitutes a cam curvature; the greater part of said periphery has a smallest radius $R_3$ and the remaining portion of that periphery is a cam face, the radius of which fluctuates continually between the greatest radius $R_2$ in the middle region of the cam face and the radius $R_1$ at the end regions. The diaphragm flap 11 is formed as a strip extended over the width of cylinder 9. Supporting arms 23, pivotable about a pivot axle 19, are arranged at two opposite ends of the strip-like flap 11. One of the supporting arms 23 is formed as a scanning tip or head 23a, the point of which lies against the side wall of the cam element 21 of the cam disc 25 and is continually supported against the cam element 21 under the action of a spring 20. It is expedient, however, that arm 23, carrying the scanning tip 23a, be subdivided into two arm portions 23b, 23c which are pivoted about the pivot axle 19 and provided with an adjusting bolt 22 arranged between the arm portions 23b and 23c whereby the arm portion 23c by means of spring 20 is pulled relative to the adjusting bolt 22, supported on the arm portion 22b, so that the arm portions 23b, 23c form a rigid unit in the direction of scanning.

The mode of the operation of the apparatus shown in FIGS. 1–4 is as follows:

The rotation of the drive pinion 15 is always executed in the same direction. If the scanning tip 23a lies against the cam element 21 in the region of its smallest radius $R_3$ the diaphragm slot between the diaphragm flaps 10 and 11 is closed so that cylinder 9 is screened from light. In the microfilm-reading position the carriage 14 takes the position shown in FIG. 1 by dash-dotted lines. The carriage 14 thereby frees way for the path of rays to the image screen 5. If the copying process is disstopped by a respective non-shown switch the carriage 14 is moved to the right-hand position shown by the solid lines while the diaphragm slot still remains closed. After the reversing point, formed by the chain wheel 13, has been overcome the illumination system, previously switched to a reading clearness, is switched over to a copying clearness and the copying process starts. The scanning tip or head 23a now runs against the portion of the cam element 21 with the radius fluctuating between the radii $R_1$ and $R_2$. Thereby the width of the diaphragm slot changes in accordance with the position of carriage 14 and in accordance with the clearness or brightness of the evenly projected image column. The carriage 14 reaches its left-hand position in FIG. 1 at the end of the copying process. The exact positioning of the cam disc 25 or the timely correct switching of the illumination system can be provided by microswitches 26, 27 which are cooperated with a cam element 25a also provided on the cam disc 25 coaxially therewith.

Figure 6:
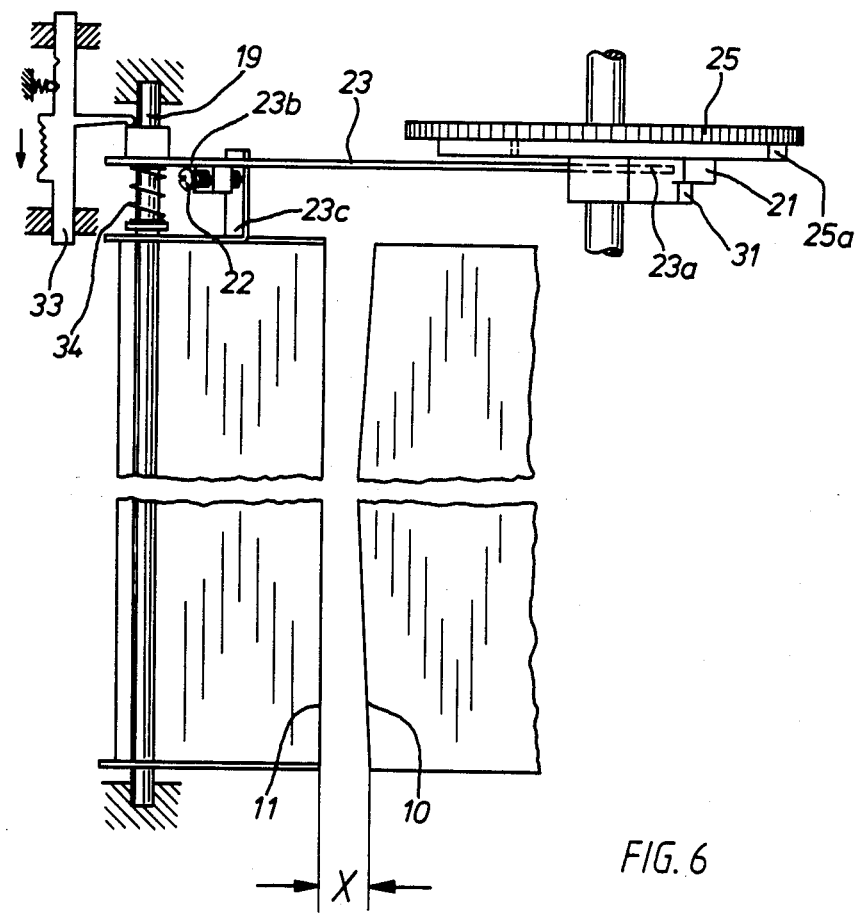

FIGS. 5 and 6 illustrate another embodiment of the control device for adjusting the position of the movable flap 11 which is shiftable to provide various widths of the diaphragm slot. This can be advantageous for the adjustment to the light intensity-difference in case of interchange of objectives. In this case a second cam element 31 is coaxially mounted on cam disc 25 and offset vertically relative to cam element 21. Both cam elements 21 and 31 have the same radius $R_3$ while radii $R_1$ and $R_4$ and the intermediate radii positioned therebetween differ from each other. The cam face of the cam element 21 extends over angle $\alpha_1$ while the cam face of cam element 31 extends over angle $\alpha_2$. The adjustment of the scanning tip 23a against a desired cam element is executed by an adjustment slide 33 movable against the action of a spring 34 as can be clearly observed from FIG. 6.

It is, of course, understable that any other embodiments of the control device for the adjustment of the width of the diaphragm slot are possible. For example, it is possible to adjust both diaphragm flaps 10, 11 in dependence on the position of carriage 14 in the counter direction. All constructions of the conventional photographic diaphragms with two oppositely movable slides can be utilized for this purpose. The control can be carried out by a common cam element, for example by a single cam element 21 or by two different cam elements. It is also possible to use two displaceable diaphragm slides in place of one pivotal flap 11 and to control such a displacement by a cam arrangement. It is further possible to provide a form-locking coupling between the diaphragm flap 11 and/or stationary strip 10 with the cam element 21 instead of force-locking coupling.

It will be understood that each of the elements described above, or two or more together, may also find a useful application in other types of control devices for controlling a diaphragm slot in microfilm-reading-and-enlarging apparatus differing from the types described above.

While the invention has been illustrated and described as embodied in a control device for controlling a diaphragm slot in a microfilm-reading-and-enlarging apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A control device for controlling a slot in a diaphragm of a microfilm-reading-and-enlarging apparatus of the type including an illumination system, a projection lens having an optical axis, a movable carriage carrying thereon two mirrors facing each other and inclined at 45° relative to said optical axis, a diaphragm having a slot, and a copying cylinder rotatable synchronously with the movement of said carriage and wherein an enlarged microimage is projected in columns by said mirrors and through said slot onto said copying cylinder, the control device comprising means for adjusting said slot, said diaphragm including two flaps having edges forming said slot, at least one of said flaps being movable from a position closing said slot to a plurality of various open positions in which various widths of said slot are obtained, said adjusting means being operative for moving one of said flaps to each position, said adjusting means being coupled with said carriage.

2. The control device as defined in claim 1; and including drive means for reciprocally moving said carriage, said drive means including a crank drive and driven chain means connected to said drive, said chain means including a wheel, said adjusting means including a cam disc coupled with said wheel.

3. The control device as defined in claim 2, wherein said adjusting means further include at least one control arm coupled to said one flap and at least one cam element mounted to said cam disc for joint rotation, said control arm cooperating with said cam element.

4. The control device as defined in claim 3, wherein an edge of one of said two flaps forming said slot extends parallel to an axis of said cylinder over a straight line while an edge of another of said flaps forming said slot is curved.

5. The control device as defined in claim 4, wherein the edge of the movable flap is straight-lined.

6. The control device as defined in claim 3, wherein said movable flap is a plate having ends, two said control arms being connected to said ends.

7. The control device as defined in claim 3, wherein said control arm is pivotable about a pivot axle.

8. The control device as defined in claim 7, wherein said control arm includes two levers angularly positioned relative to each other, one of said levers having a free end which lies on said cam element.

9. The control device as defined in claim 8, wherein said control arm further includes an adjusting bolt arranged between said levers.

10. The control device as defined in claim 9, wherein said adjusting means further include a spring biasing said control arm against said cam element.

11. The control device as defined in claim 10, wherein another of said two levers rests on said adjusting bolt under the action of said spring in a force-locking fashion.

12. The control device as defined in claim 11, wherein said cam element has a cam surface extending over 360° and has an angular cam portion corresponding to the movement of said carriage before and after a copying process, said angular cam portion having a pitch line having a smaller radius $R_3$, whereby when said free end of said control arm cooperates with said angular cam portion of said cam element said one movable flap overlaps another of said flaps to cause said closing position.

13. The control device as defined in claim 12, wherein said cam surface includes a further angular cam portion, whereby when said free end cooperates with said further angular portion the latter effects the movement of said movable flap to a plurality of open positions.

14. The control device as defined in claim 13, wherein said further angular cam portion has radii $R_1$ and $R_2$, wherein radius $R_1$ is the greatest radius on the cam element and effects the movement of said movable flap to its remotest open position from said another flap to provide the slot of the greatest width and radius $R_2$ extends in the middle of said further angular cam portion, and wherein $R_3 < R_2 < R_1$.

15. The control device as defined in claim 11, further including an additional cam element coupled to said cam disc and vertically offset relative to said at least one cam element, said control arm being displaceably supported on said pivot axle and being selectively brought into engagement with said at least one cam element or said additional cam element.

16. The control device as defined in claim 15, further including switch means, said adjusting means further including a switch cam mounted to said cam disc for joint rotation and cooperating with said switch means for switching on and off said drive means and for switching over said illumination system.

* * * * *